United States Patent
Sola et al.

[11] Patent Number: 5,279,171
[45] Date of Patent: Jan. 18, 1994

[54] PNEUMATIC COUPLING FOR CONNECTING A DRIVEN MACHINE MEMBER TO A DRIVE MEMBER

[75] Inventors: Domenico Sola, Umberto; Elio Virno, Strada Genova, both of Italy

[73] Assignee: Dea spa, Turin, Italy

[21] Appl. No.: 893,229

[22] Filed: Jun. 3, 1992

[30] Foreign Application Priority Data

Jun. 7, 1991 [IT]  Italy .................... TO91A 000436

[51] Int. Cl.⁵ .................. F16H 25/18; F16C 32/06
[52] U.S. Cl. ........................... 74/89; 248/636; 384/12; 384/99; 403/37
[58] Field of Search ............ 248/636; 384/12, 99; 403/5, 34, 35; 74/89, 89.15

[56] References Cited

U.S. PATENT DOCUMENTS

| 4,648,723 | 3/1987 | Sugiyama et al. | 384/12 X |
| 4,802,774 | 2/1989 | Pesikov | 384/12 |
| 4,946,293 | 8/1990 | Helms | 384/12 |

*Primary Examiner*—Allan D. Herrmann
*Attorney, Agent, or Firm*—Klauber & Jackson

[57] ABSTRACT

A pneumatic coupling for connecting a driven machine member, such as a gantry type carriage of a measuring machine, to a drive member whereby the driven member is moved along a given axis; the coupling substantially comprising a bracket integral with the driven member and defining two facing walls perpendicular to the aforementioned axis; and a drive element integral with the drive member and located between the walls of the bracket via the interposition of respective air pads fitted to the walls via respective spherical supports.

9 Claims, 1 Drawing Sheet

PNEUMATIC COUPLING FOR CONNECTING A DRIVEN MACHINE MEMBER TO A DRIVE MEMBER

BACKGROUND OF THE INVENTION

The present invention relates to a pneumatic coupling for connecting a driven machine member, such as a gantry type carriage of a measuring machine, to a drive member whereby the driven member is moved linearly along a given axis.

For precision applications, such as measuring machines, driven members are connected by pneumatic couplings to the drive members for moving the former linearly along a given axis. Such couplings comprise a bracket integral with the driven member and defining two facing walls perpendicular to the axis along which the driven member travels; and a drive element integral with the drive member, located between said walls, and cooperating with the same via the interposition of a fluid passage.

Movement of the drive element along said axis is thus transmitted to the bracket and, consequently, to the driven member, via the fluid passage, which presents a high degree of rigidity perpendicular to its thickness. Any "spurious" movement perpendicular to the axis of motion, due to vibration or dimensional inaccuracy of the drive system, is prevented from being transmitted to the bracket by virtue of the fluid passage providing for very little friction between the drive element and bracket.

Known couplings of the type briefly described above present several drawbacks, which it is an object of the present invention to eliminate.

Firstly, due to the very small thickness (roughly 10 μm) and the rigidity of the fluid passage, known couplings do not provide for compensating for any spurious rotation about an axis perpendicular to the axis of motion, which rotation is transmitted to the driven members of the machine, thus impairing measuring precision.

SUMMARY OF THE INVENTION

According to the present invention, there is provided a pneumatic coupling for connecting a driven machine member moving along a given axis to a drive member whereby said driven member is moved along said axis; said coupling comprising a bracket integral with said driven member and having two facing walls perpendicular to said axis; drive element integral with said drive member and located between said walls; and pneumatic supporting means located between said drive element and said walls; characterized by the fact that said pneumatic supporting means comprise air pads mounted via substantially spherical supports to respective said walls and defining respective fluid passages with said drive element.

A further drawback of known couplings is the dimensional accuracy required of the bracket and drive element, so that the clearance between the two equals the thickness of the passage required for correct operation of the coupling, the tolerances involved, in fact, being measurable in μm.

It is a further object of the present invention to provide a pneumatic coupling involving no mechanical machining problems, and which provides for rapid assembly and troublefree setup.

The above object is achieved by the present invention by virtue of the coupling comprising means for adjusting the distance between the pads.

According to a further characteristic of the present invention, one of the walls on the bracket is elastically deformable for enabling it to flex in response to the lift produced by the pads and so form a fluid passage of predetermined thickness.

BRIEF DESCRIPTION OF THE DRAWINGS

A preferred, non-limiting embodiment of the present invention will be described by way of example with reference to the accompanying drawings, in which.

DETAILED DESCRIPTION OF THE INVENTION

Figure 2:
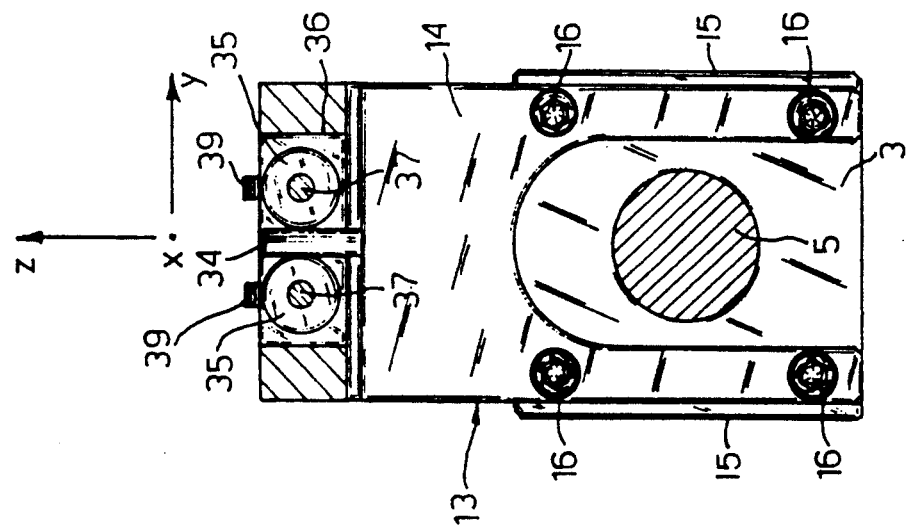
FIG. 2 shows a section along line II—II in FIG. 1.
Figure 1:
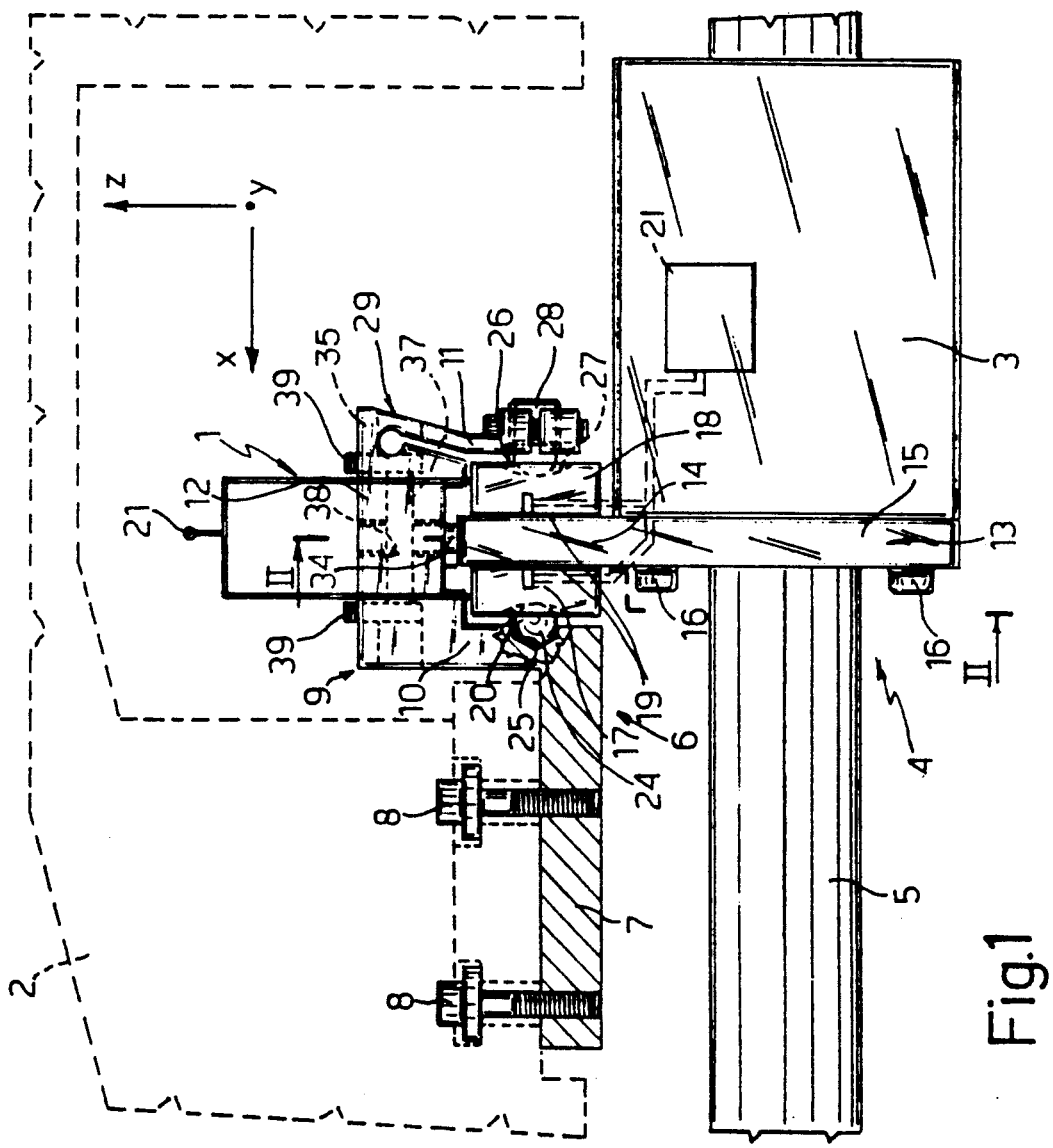
FIG. 1 shows a partially-sectioned side view of a pneumatic coupling in accordance with the teachings of the present invention.

Number 1 in the accompanying drawings indicates a pneumatic coupling for connecting the gantry 2 of a measuring machine, running on tracks (not shown) along a horizontal axis X, to a drive member 3 for moving gantry 2 along said axis.

More specifically, the X-axis travel of gantry 2 (a bottom portion of which is shown schematically by the dotted line) is controlled in known manner by a drive system 4 comprising a smooth bar 5 parallel to the X axis and rotated by a motor (not shown); and a friction casing secured so as to move frictionally along bar 5 and constituting said drive member 3 of gantry 2.

Coupling 1 substantially comprises a bracket 6 consisting of a connecting plate 7 rigidly secured by screws 8 to gantry 2; and a substantially C-shaped drive portion 9 integral with plate 7. More specifically, portion 9 consists of two spaced, facing walls 10, 11 perpendicular to the X axis and connected by a fat horizontal top wall 12.

Coupling 1 also comprises drive element 13 integral with 3, for transmitting motion to racket 6, and consisting of a flat plate 14 perpendicular to the X axis and located between walls 10 and 11 of bracket 6. From wall 14, there extend downwards two lateral appendixes 15 secured rigidly by screws 16 (FIG. 2) to the end wall of casing 3, on either side of bar 5.

Between walls 10, 11 and plate 14, there are provided respective air pads 17, 18 of any known type, connected to a compressed air source 21, and cooperating with respective opposite faces of plate 14 via respective fluid passages 19.

According to the present invention, pads 17, 18 are mounted so as to oscillate on respective spherical supports.

More specifically, on the face opposite that cooperating with plate 14, pad 17 presents a concave seat 20 cooperating with a ball 24 having a smaller radius than seat 20 and secured, e.g. bonded, inside a seat 25 on wall 10 of bracket 6.

Similarly, on the face opposite that cooperating with plate 14, pad 18 presents a concave seat 26 cooperating with the spherical head 27 of a screw 28 parallel to the X axis and screwed inside wall 11 of bracket 6. Screw 28 provides for adjusting the distance between pads 17 and 18, in particular for enabling assembly of the coupling as described later on.

According to a further characteristic of the present invention, wall 11 is connected integral with wall 12 by a virtual hinge 29 defined by a small-section connecting portion and at which wall 11 is thus permitted to flex. Virtual hinge 29 is conveniently sized so that the flexural rigidity of wall 11 is relatively small, at any rate less than the in-service rigidity of the fluid passages.

According to a further characteristic of the present invention, coupling 1 features means for preventing casing 3 from being rotated by bar 5. Said means comprise a cylindrical pin 34 (FIG. 2) secured rigidly, with its axis parallel to vertical axis Z, to the top edge of plate 14, and free to slide between two rollers 35 housed in a transverse seat 36 in wall 12 of bracket 6. Rollers 35 are mounted in idle manner on respective pins 37 parallel to the X axis and on either side of pin 34. Pins 37 are housed in respective longitudinal holes 38 in wall 12, wherein they are locked axially by respective pairs of stop pins 39 cooperating with the ends of each pin.

Coupling 1 operates as follows.

At assembly, screw 28 is so adjusted as to sandwich plate 14 between pads 17 and 18 and so produce a flexible preload on wall 11, in which case, the thickness of the fluid passage is obviously zero.

When pads 17 and 18 are supplied with compressed air, the resulting pressure (lift) on the pads detaches them from plate 14 and flexes wall 11 outwards.

As is known, the lift of a fluid passage depends on the thickness and operating pressure, according to known characteristic curves.

In the transient condition, the total lift of pads 17 and 18 is greater than the elastic reaction of wall 11, which is thus flexed outwards. As the thickness of the passages increases, however, total lift decreases sharply, according to a characteristic lift-pressure curve, until it eventually equals the elastic reaction exerted by wall 11.

The service thickness of the passages is thus defined by the balance position of the pads under the elastic load exerted by wall 11. At the design stage, wall 11 and, in particular, virtual hinge 29 must be so sized as to achieve the required service conditions of the air pads (passage thickness and lift).

Screw 28 may be set rapidly, by the operator repeatedly varying the preload of wall 11 until a predetermined thickness of the passage is achieved, and with a certain amount of tolerance by virtue of the flexibility of wall 11, any minor differences in the flexing of which have a negligible effect on the elastic load.

In actual use translation of casing 3 along the X axis is transmitted by drive element 13 to bracket 6 via air pads 17, 18, the rigidity of the fluid passages being such as to ensure motion in the direction of the X axis is transmitted substantially as if casing 3 and gantry 2 were integral with each other.

Excepting the restraints due to pin 34 contacting rollers 35, which we shall come back to later on, the use of air pads 17 and 18 mounted on spherical supports provides for any degree of translational or rotational freedom of drive element 13 in relation to bracket 6, except, obviously, for relative translation along the X axis. More specifically, pads 17 and 18 are free to rotate on their respective spherical supports, and therefore to absorb any relative rotation about axis Y or Z, which relative movement is substantially only a rolling movement and, as such, accompanied by a small amount of rolling friction.

The restraints introduced by pin 34 are due exclusively to the need for preventing rotation of casing 3, which therefore prevents relative rotation about the X axis and relative translation in relation to the Y axis. In the embodiment shown of coupling 1, the above restraints were introduced for cost and production reasons, so as to eliminate the need for a sliding pair between casing 3 and the fixed parts of the machine. The two degrees of freedom denied coupling 1 therefore apply to the design selected for the specific embodiment described herein, which may alternatively provide for complete disconnection of the connected parts for enabling any degree of freedom other than translation along the X axis.

The advantages of coupling 1 according to the present invention will be clear from the foregoing description.

In particular, the use of two opposed air pads mounted on spherical supports provides for disconnecting the driven member from the drive member for enabling any degree of freedom, with the exception of translation along the X axis, and, in particular, for relative rotation about an axis (Y or Z) perpendicular to the axis of travel (X).

Moreover, screw 28 and flexible wall 11 provide for rapid assembly and calibration of the coupling.

To those skilled in the art it will be clear that changes may be made to coupling 1 as described and illustrated herein without, however, departing from the scope of the present invention.

In particular, coupling 1 may be used for connecting any driven member traveling along a given axis to a respective drive member; and the drive member may form part of any type of drive system, e.g. screw-nut-screw or rack-and-pinion, in which case, the means for preventing rotation of casing 3 may either be dispensed with or replaced by any other means suitable for the drive system in question.

We claim:

1. A pneumatic coupling (1) for connecting a driven machine member (2), movable along a given axis (X), to a drive member (3) whereby said driven member (2) is moved along said axis (X); said coupling (1) comprising a bracket (6) integral with said driven member (2) and having two facing walls (10, 11) perpendicular to said axis (X); a drive element (13) integral with said drive member (3) and located between said walls (10, 11); and pneumatic supporting means (17, 18) located between said drive element (13) and said walls (10, 11); wherein said pneumatic supporting means comprises air pads (17, 18) mounted via spherical supports (24, 27) to respective said walls (10, 11) and defining respective fluid passages (19) with said drive element (13); wherein one of said walls (11) of said bracket (6) is deformed elastically by the load exerted by said air pads (17, 18).

2. A coupling as claimed in claim 1, further comprises means (28) for adjusting the distance between said pads (17, 18).

3. A coupling as claimed in claim 2, wherein said means for adjusting the distance between said pads (17, 18) comprises a screw (28) for adjusting the position of one of said spherical supports along said given axis (X).

4. A coupling as claimed in claim 3, wherein said screw (28) presents a spherical head (27) defining said spherical support of said respective pad (18).

5. A coupling as claimed in claim 1, wherein said wall (11) is connected integral with a substantially rigid portion (12) of said bracket (6) by a small-section portion (29) defining a virtual hinge (29).

6. A coupling as claimed in claim 1, wherein said coupling restraining means (34, 35) for preventing rotation of said drive member (3) about said axis (X).

7. A coupling as claimed in claim 6, wherein said restraining means comprise a pin (34) projecting from said drive element (13) perpendicular to said axis (X); and two rollers (35) mounted in idle manner on said bracket (6), parallel to said axis, and cooperating on opposite sides with said pin (34).

8. A coupling as claimed in claim 1, wherein said driven member is the carriage (2) of a measuring machine.

9. A coupling as claimed in claim 8, wherein said drive member is the casing (3) of the drive system (4) of said carriage (2) which comprises a smooth bar (5).

* * * * *